(12) United States Patent
Ger et al.

(10) Patent No.: US 8,581,099 B2
(45) Date of Patent: Nov. 12, 2013

(54) PHOTOVOLTAIC JUNCTION BOX

(75) Inventors: Chih-Chan Ger, Jhongli (TW);
Yu-Hsiang Liao, Jhongli (TW);
Shang-Ting Chen, Jhongli (TW);
Yun-Bing Wang, Jhongli (TW)

(73) Assignee: Ampower Technology Co., Ltd.,
Jhongli, Taoyuan County (TW)

( * ) Notice: Subject to any disclaimer, the term of this patent is extended or adjusted under 35 U.S.C. 154(b) by 90 days.

(21) Appl. No.: 13/433,188

(22) Filed: Mar. 28, 2012

(65) Prior Publication Data
US 2013/0014970 A1    Jan. 17, 2013

(30) Foreign Application Priority Data
Jul. 11, 2011    (CN) .......................... 2011 2 0241554

(51) Int. Cl.
*H01R 13/46* (2006.01)

(52) U.S. Cl.
USPC .............. 174/59; 174/50; 174/520; 439/76.1; 361/730

(58) Field of Classification Search
USPC .......... 439/76.1; 361/707, 752, 730; 136/243, 136/244; 174/50, 59, 520
See application file for complete search history.

(56) References Cited

U.S. PATENT DOCUMENTS

| | | | |
|---|---|---|---|
| 7,759,575 B2 * | 7/2010 | Jones et al. ...................... | 174/50 |
| 8,053,670 B2 * | 11/2011 | Lin et al. ......................... | 174/59 |
| 8,263,880 B2 * | 9/2012 | Kraus ............................ | 174/541 |

* cited by examiner

*Primary Examiner* — Dhirubhai R Patel
(74) *Attorney, Agent, or Firm* — Altis & Wispro Law Group, Inc.

(57) ABSTRACT

A photovoltaic junction box includes a housing, a circuit board received in the housing, a plurality of metal brackets, and a plurality of bypass diodes. The plurality of metal brackets are secured to the circuit board, each of the plurality of metal brackets defines a receiving space receiving a spring sheet. The plurality of bypass diodes are respectively secured to the plurality of metal brackets and electrically connected to the circuit board. Each of a plurality of ribbons is clamped between the spring sheet and a corresponding metal bracket, and the ribbon directly and electrically contacts the corresponding metal bracket.

7 Claims, 15 Drawing Sheets ated to co-pending application Ser. No. 13/426,609 filed on Mar. 22, 2012 and titled "HEAT DISSIPATING ASSEMBLY OF PHOTOVOLTAIC JUNCTION BOX".

BACKGROUND

1. Technical Field

The present disclosure generally relates to photovoltaic (PV) power generation systems, and more particularly to a photovoltaic junction box for a photovoltaic power generation system.

2. Description of Related Art

A photovoltaic (PV) power generation system comprises a plurality of PV panels connected together through cables and PV junction boxes. One of the plurality of PV panels is electrically connected to a circuit board of a PV junction box via a plurality of ribbons soldered onto the circuit board. The PV junction box is structured on one corresponding PV panel and comprises a plurality of bypass diodes configured on the circuit board. The bypass diodes generate heat when the PV panel could not receive solar radiations, and an overheated bypass diode may damage the PV junction box. Furthermore, the ribbons are prone to fall off from the circuit board of the PV junction box due to mis-soldering between the ribbons and the circuit board.

Therefore, a need exists in the industry to overcome the described problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
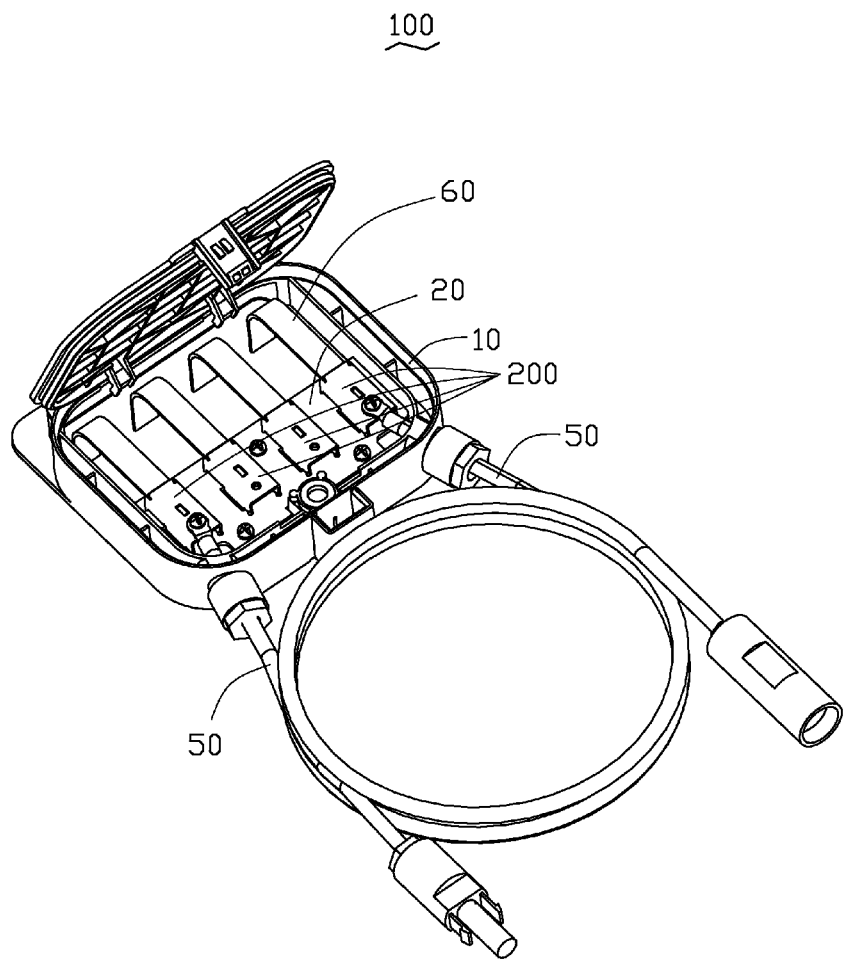
FIG. 1 is a perspective view of a photovoltaic (PV) junction box of a first exemplary embodiment of the disclosure, showing an inner structure of the PV junction box.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

With reference to FIG. 1, a photovoltaic (PV) junction box 100 comprises a housing 10, a circuit board 20 received in the housing 10, a plurality of fixing mechanisms 200 secured to the circuit board 20, and a pair of cables 50 respectively connecting two of the plurality of fixing mechanisms 200 to corresponding two electrical terminals of a power conversion device (not shown), such as an inverter. A plurality of ribbons 60 are respectively and electrically secured to the plurality of fixing mechanisms 200, to electrically connect the circuit board 20 of the PV junction box 100 to a PV panel (not shown). Electrical current flows from the PV panel through the plurality of ribbons 60 to the PV junction box 100, and to the power conversion device by way of the pair of cables 50 (shown in FIG. 9 and FIG. 10).

Figure 2:
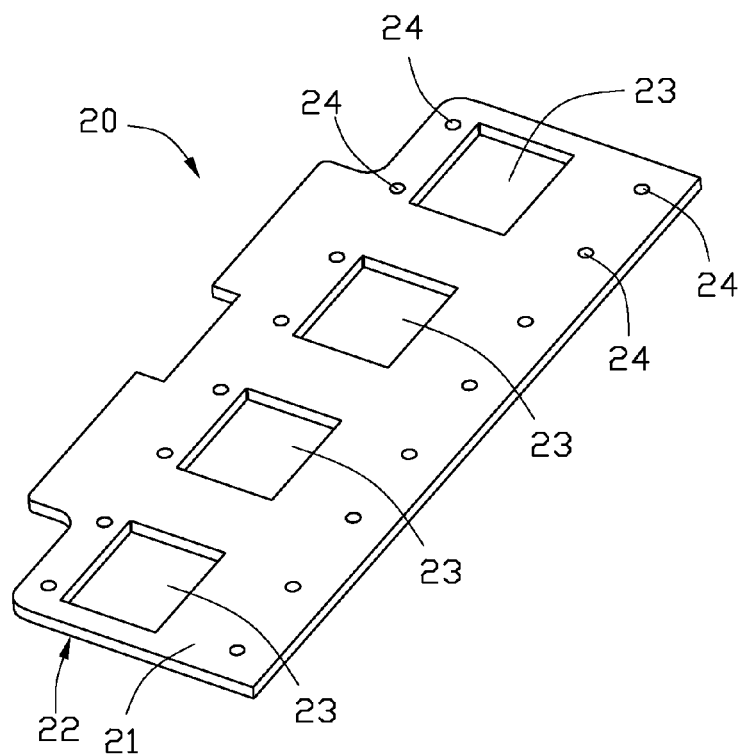
FIG. 2 is a perspective view of a circuit board of the PV junction box of FIG. 1.

With reference to FIG. 2, the circuit board 20 comprises a top surface 21, a bottom surface 22 opposite to the top surface 21, and a plurality of holes 23 running through the circuit board 20 from the top surface 21 to the bottom surface 22 and corresponding to the plurality of fixing mechanisms 200. A plurality of securing holes 24 are defined on two sides of the plurality of holes 23. In the embodiment, four securing holes 24 match with one of the plurality of holes 23, and are positioned close to four corners of each of the plurality of holes 23. In one example, the plurality of securing holes 24 are divided into four groups and each group has four securing holes 24. Each group of securing holes 24 are positioned close to four corners of each holes 23.

Figure 3:
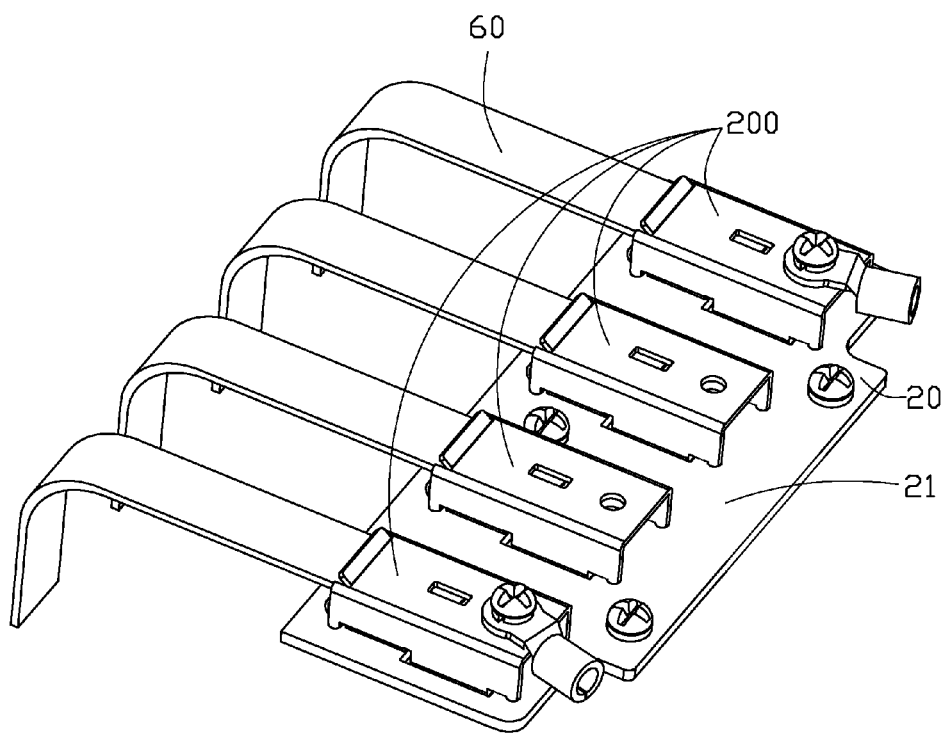
FIG. 3 is an enlarged view showing exemplary relationships among a plurality of ribbons, a plurality of fixing mechanisms, and the circuit board.
Figure 4:
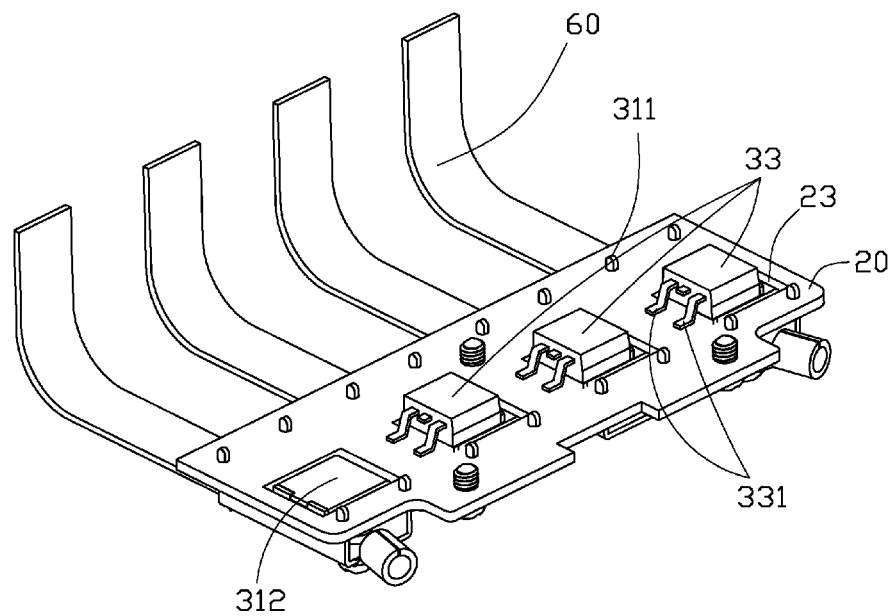
FIG. 4 is an inverted view of FIG. 3.

With reference to FIGS. 3-4, the plurality of fixing mechanisms 200 are positioned on the top surface 21 of the circuit board 20. A plurality of bypass diodes 33 are electrically connected to the bottom surface 22 of the circuit board 20 via a pair of feet 331 of the bypass diode 33. The number of the plurality of bypass diodes 33 is one less than the number of the fixing mechanisms 200. In one example, the number of the fixing mechanisms 200 may be four, and the number of the plurality of bypass diodes 33 may be three. Each of the plurality of bypass diodes 33 is secured to one corresponding fixing mechanism 200. Thus, one of the plurality of fixing mechanisms 200 is redundant, and there is no bypass diode 33 fixed on the redundant fixing mechanism 200 which is connected to one of the pair of cables 50, as shown in FIG. 4.

Figure 5:
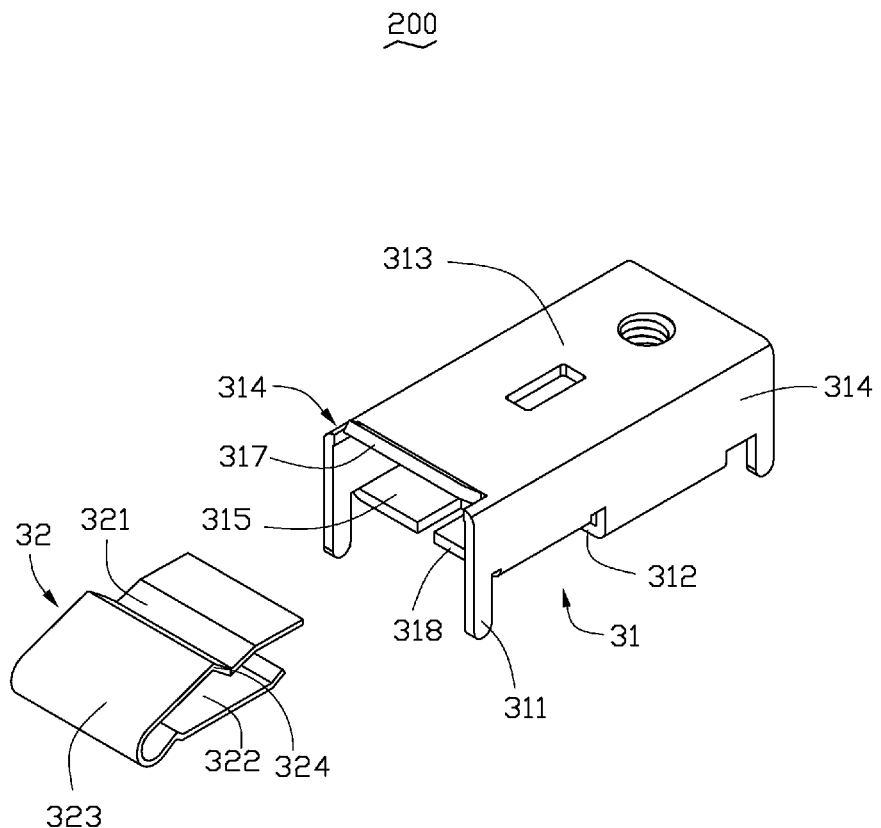
FIG. 5 is an exploded view of an exemplary embodiment of one of the plurality of fixing mechanisms of the PV junction box of FIG. 1.
Figure 6:
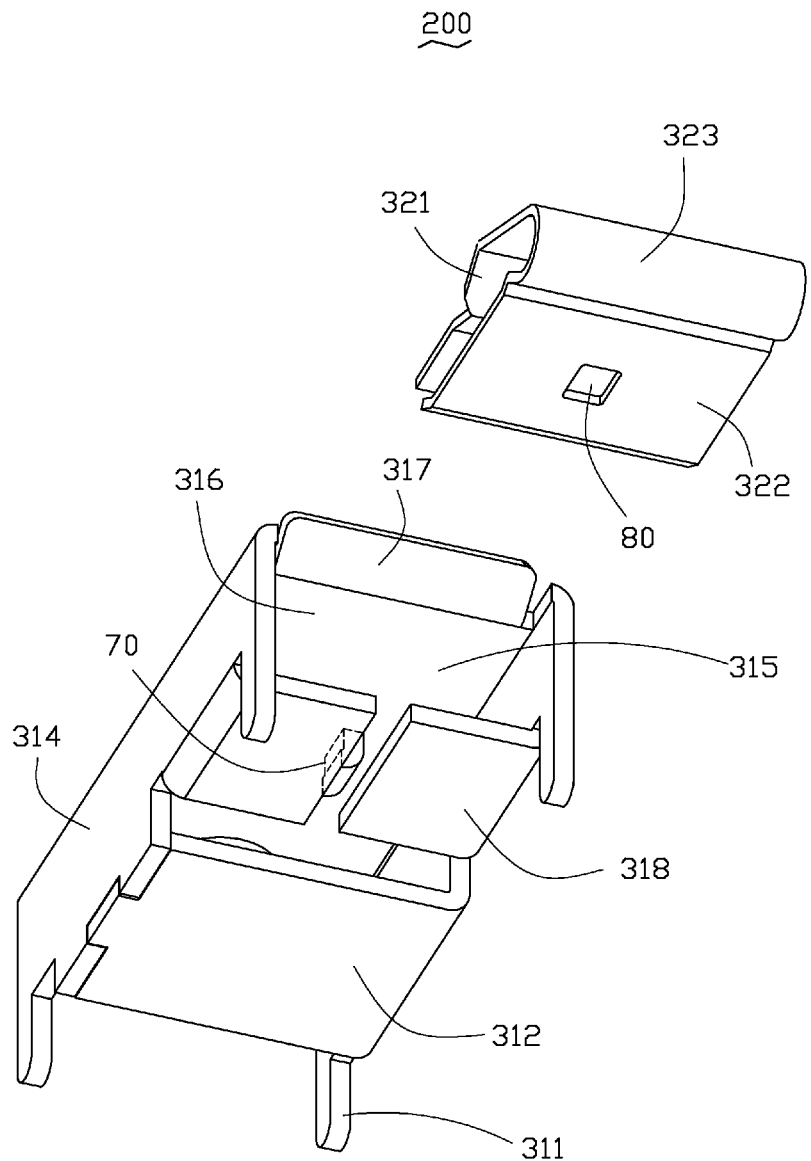
FIG. 6 is similar to FIG. 5, but viewed from a different aspect.
Figure 7:
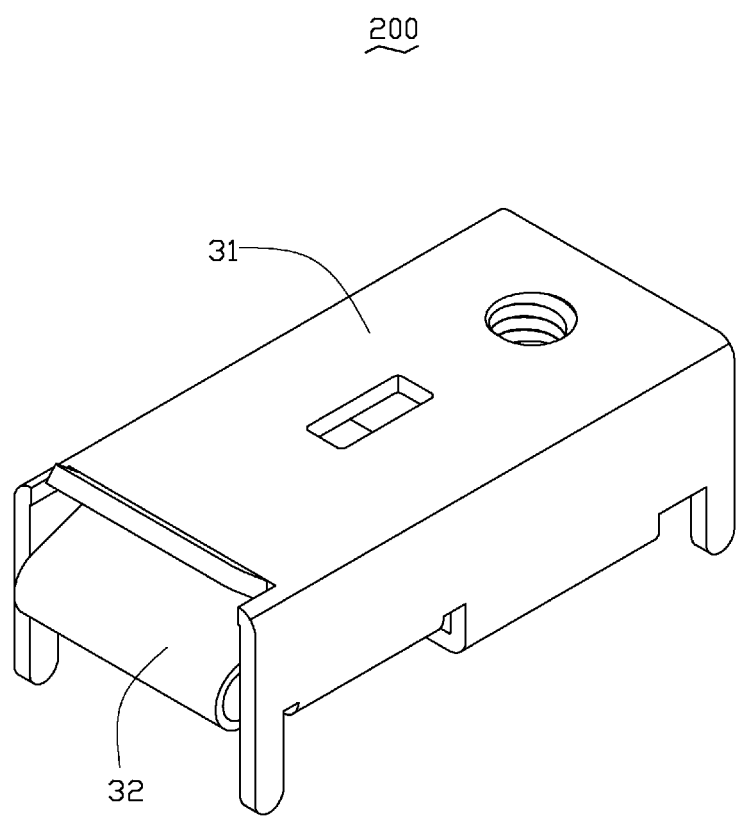
FIG. 7 is an assembled view of the one of the plurality of fixing mechanisms of FIG. 5.

With reference to FIGS. 5-7, each of the plurality of fixing mechanisms 200 comprises a metal bracket 31 and a spring sheet 32 urged in the metal bracket 31. The metal bracket 31 comprises a top wall 313, a first bottom wall 318 and a second bottom wall 312 opposite to the top wall 313, and a pair of sidewalls 314 perpendicularly connected between the top wall 313 and the first, second bottom walls 318, 312. In the embodiment, the second bottom wall 312 keeps a farther distance from the top wall 313 than that of the first bottom wall 318. That is, the first bottom wall 318 and the second bottom wall 312 collectively form a step. The second bottom wall 312, the top wall 313, and the sidewalls 314 collectively define a receiving space 315 having an opening 316 shown in FIG. 6. The metal bracket 31 comprises a plurality of positioning pins 311 extending from the sidewalls 314 of the metal bracket 31, and corresponding to the plurality of securing holes 24 in the circuit board 20.

Figure 8:
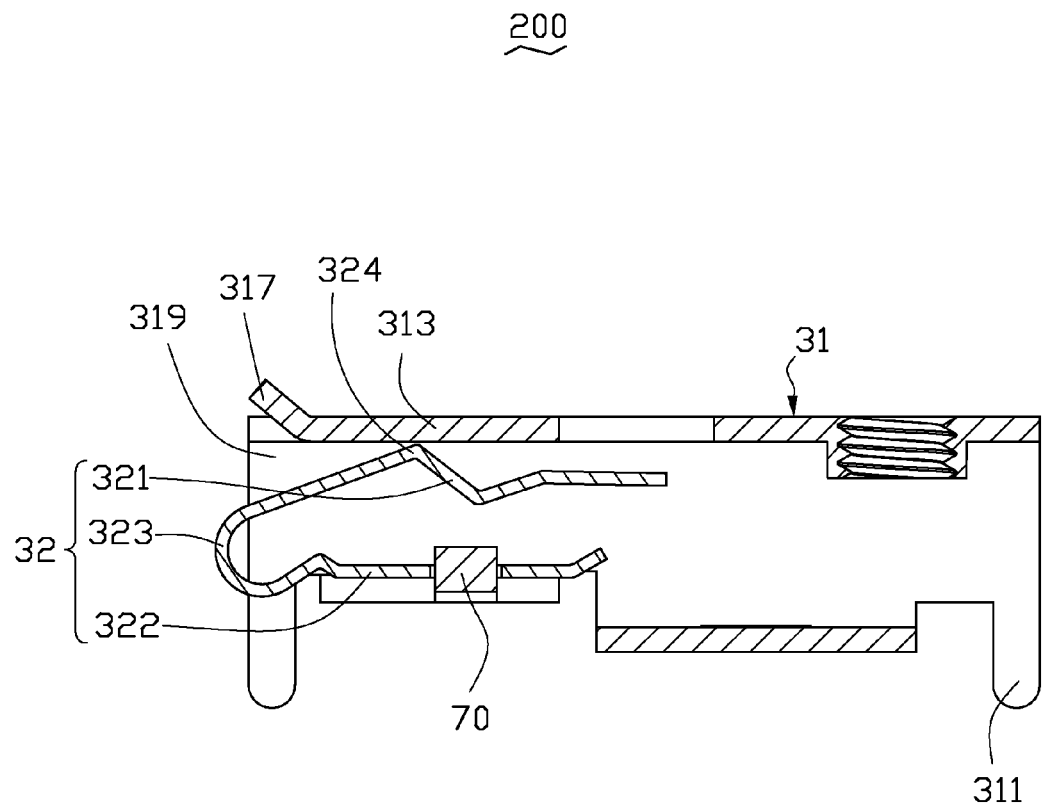
FIG. 8 is a sectional view of FIG. 7.

With reference to FIG. 8 also, the spring sheet 32 comprises an extending portion 321, a positioning portion 322 opposite to the extending portion 321, and a connecting portion 323 connecting the extending portion 321 and the positioning portion 322 resiliently. In assembly, the spring sheet 32 is received in the receiving space 315 of the metal bracket 31, a urging portion 324 between the extending portion 321 and the connecting portion 323 resists on the top wall 313 of the metal bracket 31, the positioning portion 322 is secured to the first bottom wall 318, and the connecting portion 323 is partially exposed out of the opening 316 of the metal bracket 31.

In the embodiment, the metal bracket 31 comprises a protrusion 70 extending perpendicularly from the first bottom wall 318 toward the receiving space 315, and the spring sheet 32 defines a positioning hole 80 located on the positioning portion 322. In assembly, the protrusion 70 on the metal bracket 31 engages with the positioning hole 80 of the spring sheet 32 to secure the spring sheet 32 to the metal bracket 31 firmly.

Figure 9:
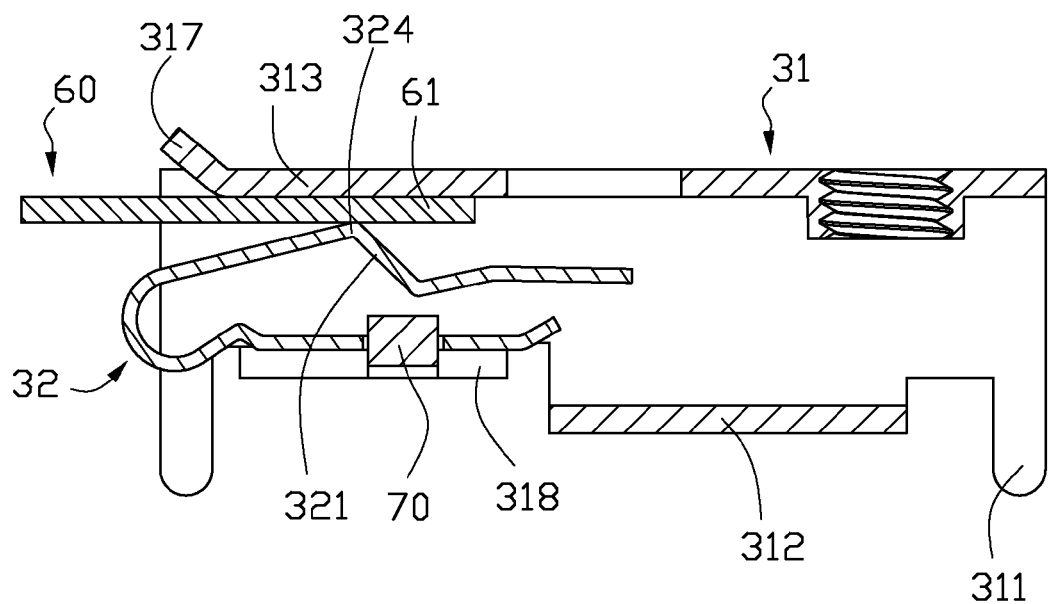
FIG. 9 is similar to FIG. 8, but showing a ribbon secured to the fixing mechanism of FIG. 8.

In the embodiment, a tail end 317 of the top wall 313 is tilted away from the opening 316 of the metal bracket 31, and the connecting portion 323 of the spring sheet 32 is substantially arc-shaped and corresponds to the tail end 317 of the top wall 313. As a result, an inserting opening 319 having a wedge shape is formed between the connecting portion 323 of the spring sheet 32 and the top wall 313 of the metal bracket 31, as shown in FIG. 8. Because of the wedge shape of the inserting opening 319, the ribbons 60 are prone to be inserted into and clamped between the top wall 313 of the metal bracket 31 and the urging portion 324 of the spring sheet 32, as shown in FIG. 9. Therefore, the fixing mechanism 200 can apply to various PV junction boxes 100 with different power, regardless of a thickness of the ribbon 60 of the PV junction box 100 varying according to power of the PV junction box 100.

In assembly of the PV junction box 100, the plurality of positioning pins 311 of the metal bracket 31 of each of the plurality of fixing mechanisms 200 are respectively plugged in corresponding securing holes 24 of the circuit board 20 to position the corresponding fixing mechanism 200 on the circuit board 20. The second bottom wall 312 of the metal bracket 31 of each of the plurality of fixing mechanism 200 is inserted into a corresponding hole 23 in the circuit board 20 from the top surface 21 of the circuit board 20 and is coplanar with the bottom surface 22 of the circuit board 20, and the first bottom wall 318 abuts the top surface 21 of the circuit board 20. Each of the plurality of bypass diodes 33 is secured to a corresponding one of the fixing mechanism 200 and contacts the second bottom wall 312 of the metal bracket 31 of the corresponding fixing mechanism 200. Each bypass diode 33 is electrically connected to the circuit board 20 via the pair of feet 331 of the bypass diode 33. The plurality of ribbons 60 are respectively secured to the plurality of fixing mechanisms 200. An inserting portion 61 of each of the plurality of ribbons 60 is clamped between the urging portion 324 of the spring sheet 32 and the top wall 313 of the metal bracket 31 of a corresponding fixing mechanism 200, as shown in FIG. 9. With this assembled structure, each of the plurality of ribbons 60 directly and electrically contacts a corresponding metal bracket 31.

Figure 10:
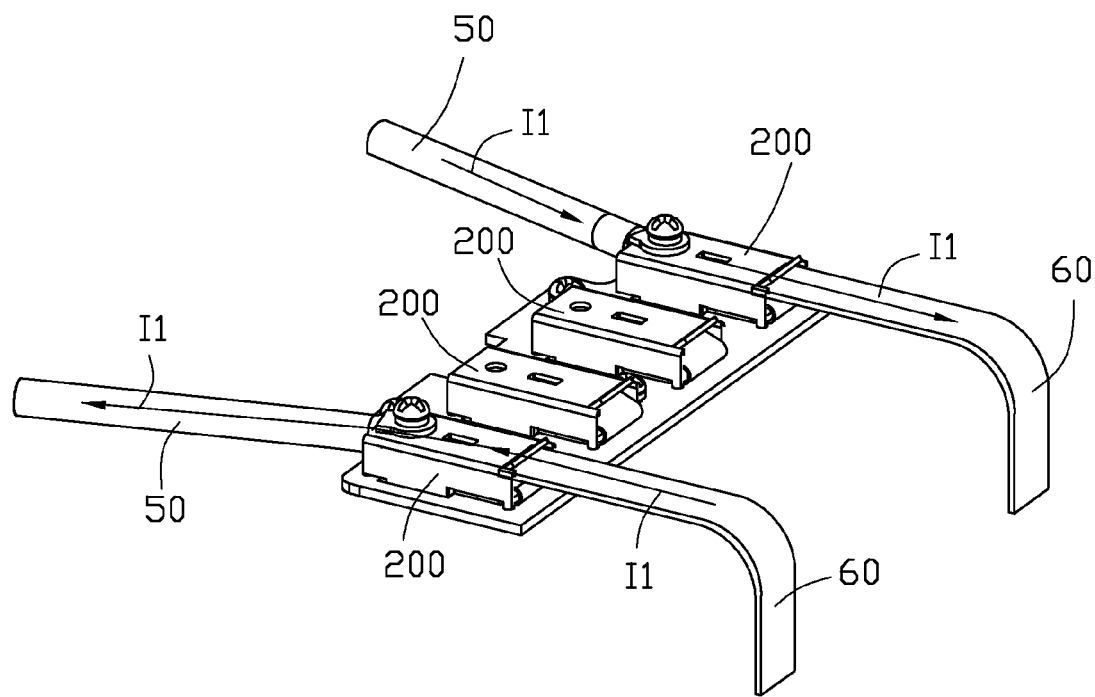
FIG. 10 is a schematic diagram of the PV junction box of FIG. 1, showing a first current flow direction of the PV junction box in a normal functional state, but not showing the housing of the PV junction box.
Figure 11:
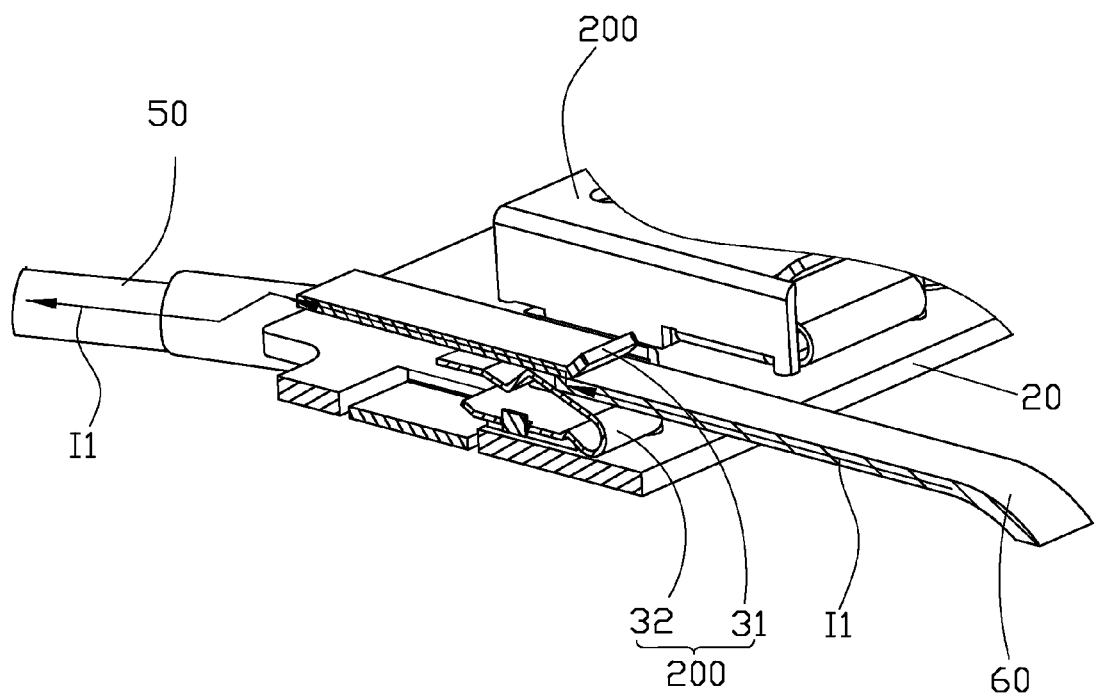
FIG. 11 is a sectional and enlarged view of FIG. 10.

FIG. 10 shows a first current flow (labeled as I1) direction of the PV junction box 100 in a normal functional state. Because each of the plurality of ribbons 60 is clamped between the metal bracket 31 and the spring sheet 32 of one corresponding fixing mechanism 200 and directly contacts the metal bracket 31, as shown in FIG. 11, the first current flow I1 flows through the metal bracket 31 directly, the metal bracket 31 is configured as a bridge for conducting the first current flow I1 between the ribbon 60 and the cable 50 in the normal function state of the PV junction box 100.

In the embodiment, the metal bracket 31 can be made of a conductive material that has a good conductivity and a low resistance (e.g., copper). The metal bracket 31 is configured as the bridge for conducting the first current flow I1, which results in low contact resistance of the PV junction box 100 and improves reliability of the PV junction box 100.

Figure 12:
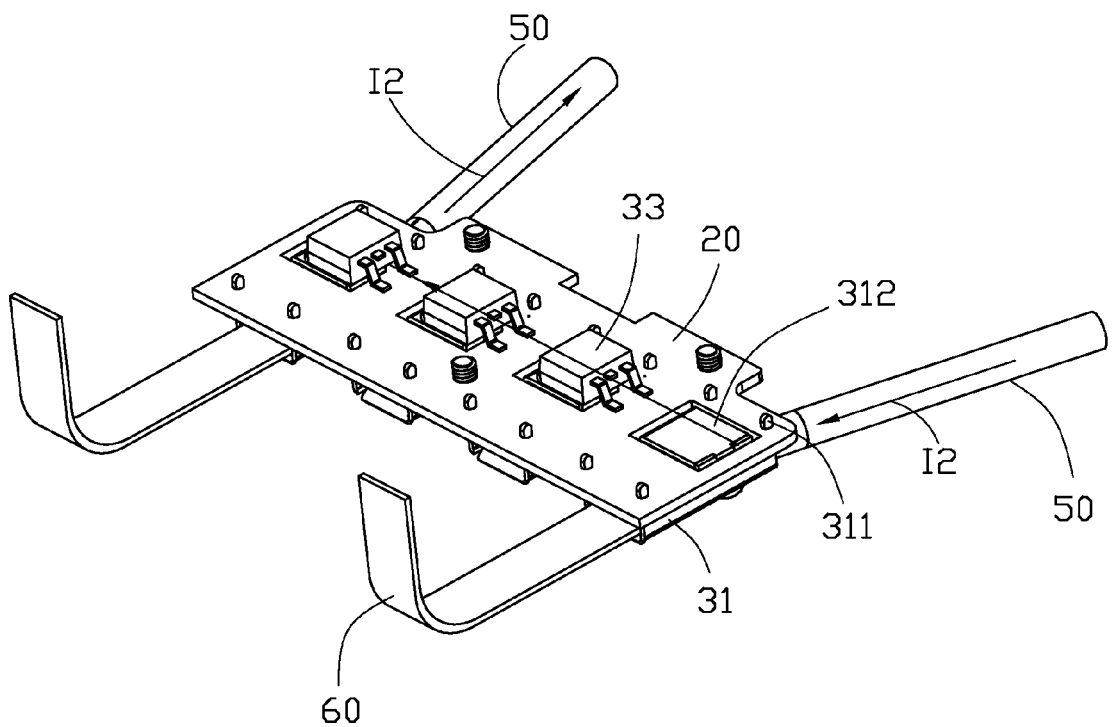
FIG. 12 is a schematic diagram of the PV junction box of FIG. 1, showing a second current flow direction of the PV junction box in an abnormal functional state, but not showing the housing of the PV junction box.

FIG. 12 shows a second current flow (labeled as I2) direction of the PV junction box 100 in an abnormal functional state. In the embodiment, the PV junction box 100 functions abnormally, because the PV panel could not receive solar radiation. In the abnormal functional state, the plurality of bypass diodes 33 are conducted, and the second current flow I2 flows through the plurality of bypass diodes 33. As a result, the plurality of bypass diodes 33 are heated. The metal bracket 31 is configured to dissipate heat generated by the bypass diodes 33 because each of the plurality of bypass diodes 33 contacts the second bottom wall 312 of the metal bracket 31 of one corresponding fixing mechanism 200. With this structure, the PV junction box 100 maintains a low temperature and low conduction loss even if the PV panel could not receive the solar radiation, due to the metal bracket 31 dissipating heat generated by the plurality of bypass diodes 33. As a result, the housing 10 of the PV junction box 100 is prevented from being deformed or cracked in the abnormal functional state of the PV junction box 100.

In the embodiment, the metal bracket 31 is configured as a three dimensional structure, which increases heat dissipating area for the bypass diodes 33.

In the embodiment, the top wall 313, the first bottom wall 318, the second bottom wall 312, and the sidewalls 314 of the metal bracket 31 are integrally formed, thus, the metal bracket 31 endures elasticity of the spring sheet 32 and is resistant to deformation. In addition, each of the plurality of ribbons 60 is manually clamped between the metal bracket 31 and the spring sheet 32 of a corresponding fixing mechanism 200, which leads to convenience of installing the ribbons 60.

In the embodiment, each of the plurality of bypass diodes 33 is soldered on the second bottom wall 312 of the metal bracket 31 of a corresponding fixing mechanism 200 via a furnacing process, which could prevent generating voids between the second bottom wall 312 of the metal bracket 31 and the bypass diode 33 and gets improvement of productivity of the PV junction box 100. In addition, because heat generated by the bypass diodes 33 is dissipated by the metal brackets 31 of the fixing mechanisms 200, the circuit board 20 of the PV junction box 100 can be made of materials with a low heat resistant grade, which also reduces cost.

Figure 13:
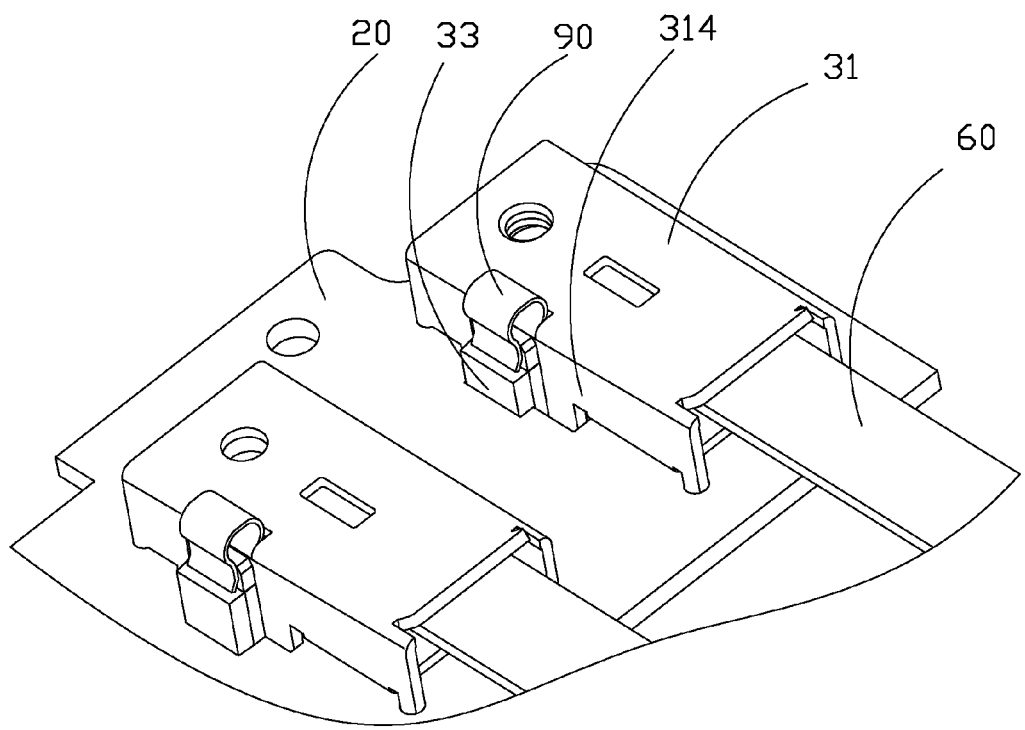
FIG. 13 is a partially and schematic view of a second exemplary embodiment of the PV junction box, showing bypass diodes secured to a sidewall of a metal bracket via resilient elements.
Figure 14:
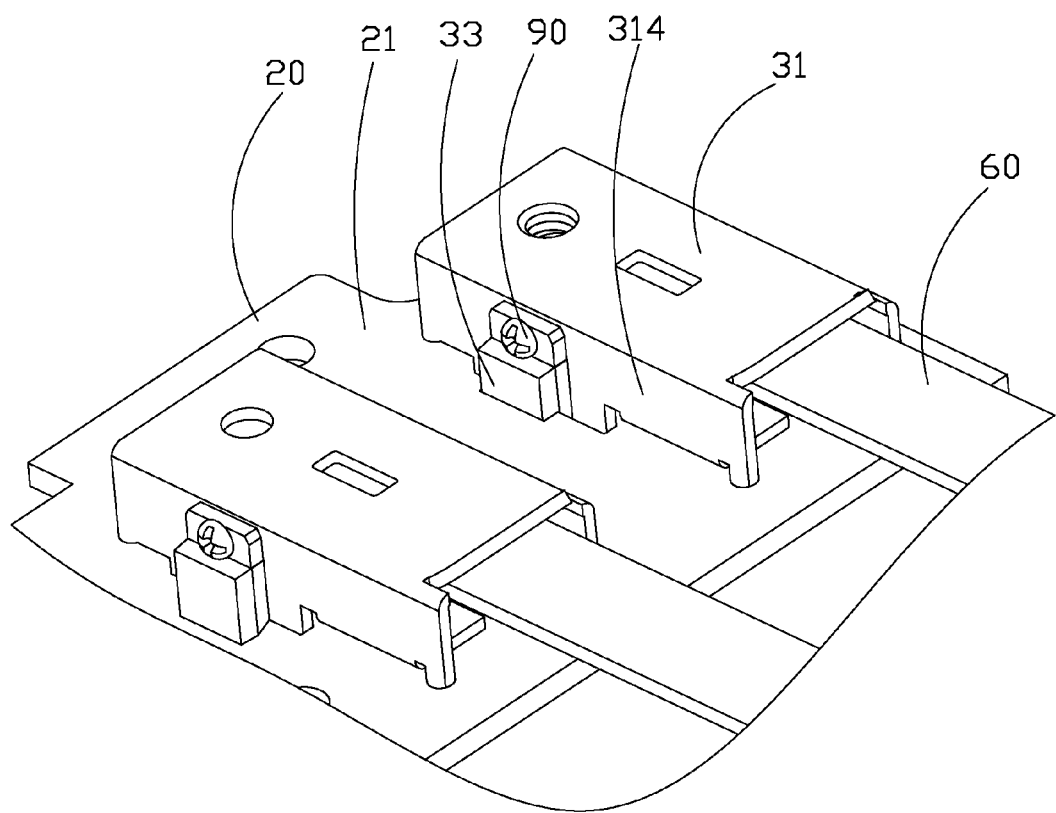
FIG. 14 is a partially and schematic view of a third exemplary embodiment of the PV junction box, showing bypass diodes secured to a sidewall of a metal bracket via screws.
Figure 15:
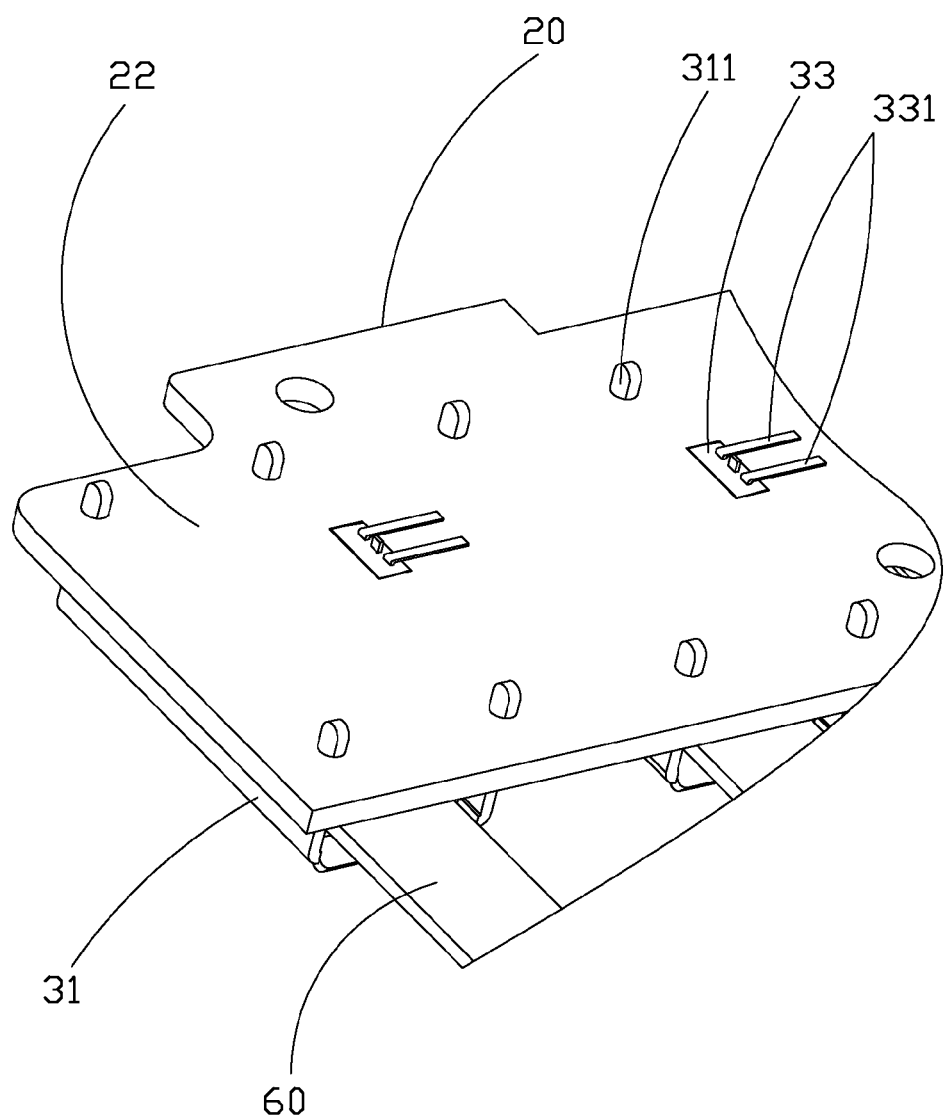
FIG. 15 is a bottom view of the PV junction box of FIG. 13 and FIG. 14, showing the bypass diodes secured to a bottom surface of the circuit board of the PV junction box.

With reference to FIGS. 13-15, in an alternative embodiment, each of the plurality of bypass diodes 33 contacts the sidewall 314 of the metal bracket 31 of a corresponding fixing mechanism 200. The bypass diodes 33 is secured to the metal bracket 31 by a fixing part 90, and the pair of feet 331 of the bypass diode 33 is inserted from the top surface 21 of the circuit board 20 to the bottom surface 22 of the circuit board 20 and electrically connected to the circuit board 20, as shown in FIG. 15. In the embodiment, the fixing part 90 is a resilient element, and the resilient element clamps the bypass diode 33 and the metal bracket 31 together, as shown in FIG. 13. In another embodiment, the fixing part 90 may be a screw, as shown in FIG. 14.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A photovoltaic junction box, comprising:
a housing; a circuit board received in the housing; and a plurality of metal brackets secured to the circuit board, each of the plurality of metal brackets defining a receiving space receiving a spring sheet, wherein each of the plurality of metal brackets comprises a top wall, a first bottom wall opposite to the top wall, and a pair of sidewalls connected between the top wall and the first bottom wall, the top wall, the first bottom wall, and the pair of sidewalls collectively define the receiving space;
Wherein each of a plurality of ribbons is clamped between the spring sheet and a corresponding metal bracket, and the ribbon directly and electrically contacts the corresponding metal bracket and spring sheet.

2. The photovoltaic junction box of claim 1, wherein the receiving space of each of the plurality of metal brackets comprises an opening toward the ribbon, the spring sheet passes through the opening and an inserting portion of the ribbon is clamped between the spring sheet and the metal bracket, so as to be secured to the metal bracket.

3. The photovoltaic junction box of claim 1, wherein the circuit board comprises a top surface, a bottom surface opposite to the top surface, and a plurality of holes running through the circuit board from the top surface to the bottom surface, and wherein each of the plurality of metal brackets comprises a second bottom wall having a farther distance from the top wall than that of the first bottom wall, the second bottom wall of each of the plurality of metal brackets is inserted into a corresponding hole in the circuit board from the top surface of the circuit board and is coplanar with the bottom surface of the circuit board.

4. The photovoltaic junction box of claim 1, wherein the spring sheet comprises an extending portion, a positioning portion opposite to the extending portion, and a connecting portion connecting the extending portion and the positioning portion resiliently, and wherein a urging portion between the extending portion and the connecting portion resists on the top wall of a corresponding metal bracket, the positioning portion is secured to the first bottom wall.

5. The photovoltaic junction box of claim 4, wherein each of the plurality of metal brackets comprises a protrusion extending from the first bottom wall and toward the receiving space, the spring sheet defines a positioning hole located on the positioning portion, and the protrusion on the metal bracket engages with the positioning hole of the spring sheet.

6. The photovoltaic junction box of claim 4, wherein a tail end of the top wall of each of the plurality of metal brackets is tilted away from the opening of the metal bracket, the connecting portion of the spring sheet is substantially arc-shaped and corresponds to the tail end of the top wall.

7. The photovoltaic junction box of claim 6, wherein a wedge shape is formed between the connection portion of the spring sheet and the top wall of the metal bracket.

* * * * *